(12) United States Patent
Wobben

(10) Patent No.: US 7,311,490 B2
(45) Date of Patent: Dec. 25, 2007

(54) ROTOR BLADE WITH AN ELECTRICAL FIELD

(76) Inventor: Aloys Wobben, Argestrasse 19, Aurich (DE) 26607

( * ) Notice: Subject to any disclaimer, the term of this patent is extended or adjusted under 35 U.S.C. 154(b) by 346 days.

(21) Appl. No.: 11/085,630

(22) Filed: Mar. 21, 2005

(65) Prior Publication Data

US 2005/0201865 A1    Sep. 15, 2005

Related U.S. Application Data

(63) Continuation-in-part of application No. PCT/EP03/10274, filed on Sep. 16, 2003.

(30) Foreign Application Priority Data

Sep. 21, 2002  (DE) ............................... 102 44 022

(51) Int. Cl.
  *F03D 7/02*    (2006.01)
  *F03D 11/00*   (2006.01)
(52) U.S. Cl. ...................... 415/4.3; 415/119
(58) Field of Classification Search ............ 415/4.1, 415/4.3, 119; 416/146 R, 62; 244/130
  See application file for complete search history.

(56) References Cited

U.S. PATENT DOCUMENTS

| 2,102,527 A | 12/1937 | Hadley ........................ 244/1 |
| 3,120,363 A | 2/1964  | Hagen ......................... 244/62 |

FOREIGN PATENT DOCUMENTS

| DE | 196 14 420 C2 | 10/1997 |
| DE | 197 12 034 A1 | 9/1998  |
| DE | 197 43 694 C2 | 4/1999  |
| DE | 198 04 308 A1 | 4/1999  |
| DE | 198 07 477 C2 | 4/1999  |
| EP | 0 947 693 A2  | 10/1999 |
| GB | 1106531       | 3/1968  |

*Primary Examiner*—Edward K. Look
*Assistant Examiner*—Dwayne J White
(74) *Attorney, Agent, or Firm*—Seed IP Law Group PLLC

(57) ABSTRACT

The invention concerns a rotor blade, in particular a rotor blade of a wind power installation. The object of the present invention is to provide measures for still further improving the CR-value and also the level of acoustic power of rotor blades of wind power installations. A rotor blade for a wind power installation includes a high pressure side and a low pressure side. A substantially constant, area-covering electrostatic field is provided on the low pressure side.

11 Claims, 3 Drawing Sheets

ROTOR BLADE WITH AN ELECTRICAL FIELD

BACKGROUND OF THE INVENTION

1. Field of the Invention

The invention concerns a rotor blade, in particular a rotor blade of a wind power installation.

2. Description of the Related Art

Rotor blades for wind turbines are known in many different forms. The goal is usually to design the rotor blades of a wind power installation in such a way that in operation they have a level of acoustic power which is as low as possible and in addition present such a low air resistance value that a very small amount of losses of wind energy is caused by the rotor blades.

Usually the approaches adopted for reducing the level of acoustic power and also for reducing the CR-value (coefficient of resistance) involve changing or improving an external design which is suitably adapted for the rotor blade.

BRIEF SUMMARY OF THE INVENTION

The object of the present invention is to provide measures for still further improving the CR-value and also the level of acoustic power of rotor blades of wind power installations.

BRIEF DESCRIPTION OF THE SEVERAL VIEWS OF THE DRAWING(S)

DETAILED DESCRIPTION OF THE INVENTION

The invention is attained by a rotor blade having the features of claim 1. Advantageous developments are set forth in the appendant claims.

Figure 1:
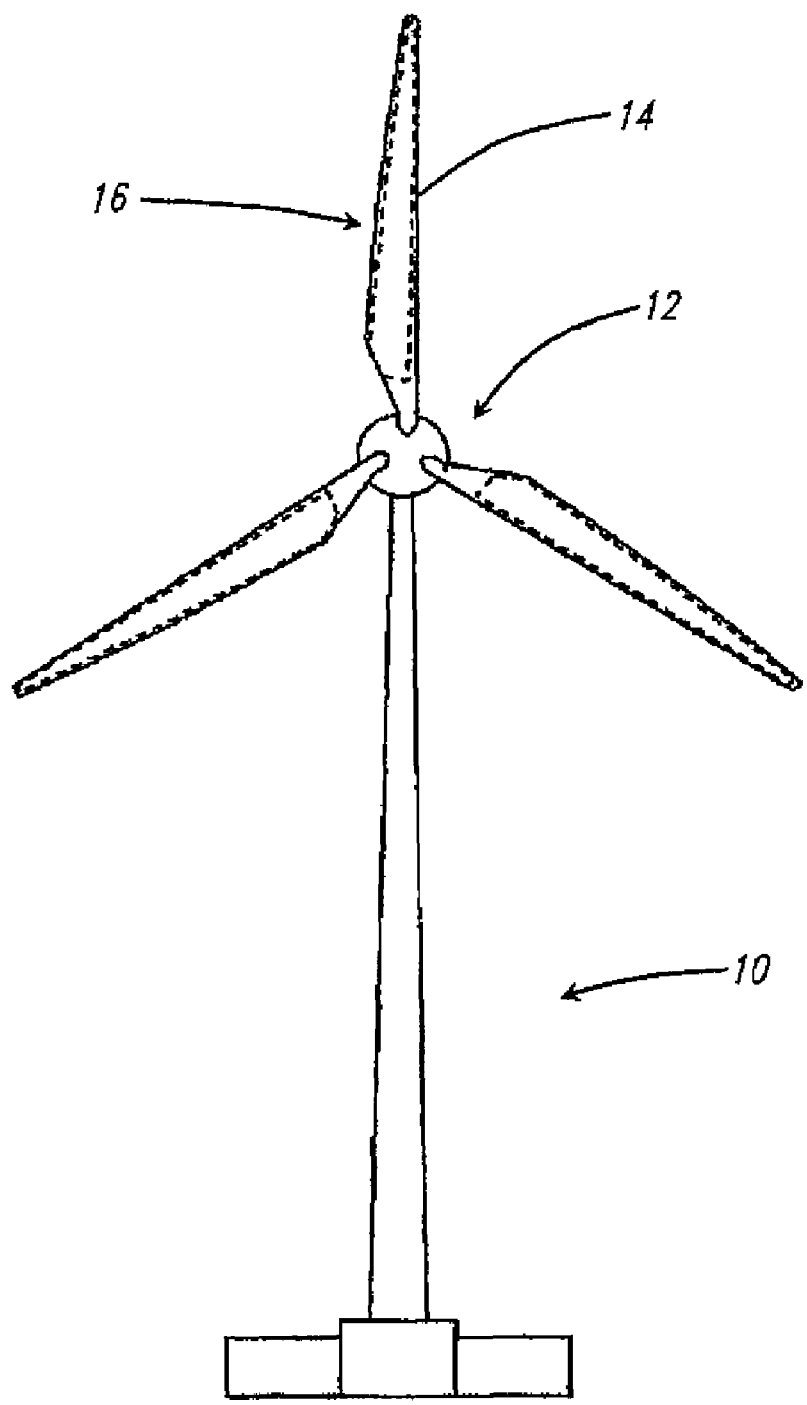
FIG. 1 shows a front view of a wind power installation including rotor blades according to the invention.

FIG. 1 shows a front view of a wind power installation 10 including rotor blades 14 according to the invention. The wind power installation 10 has a rotor 12 which carries the rotor blades 14. The present invention provides that an electrical field 16 is produced at least on the suction side of the rotor blade 14. That electrical field 16 is preferably an electrostatic field with a voltage of for example about −4 kV at the top side of the rotor blade 14.

Figure 2A:
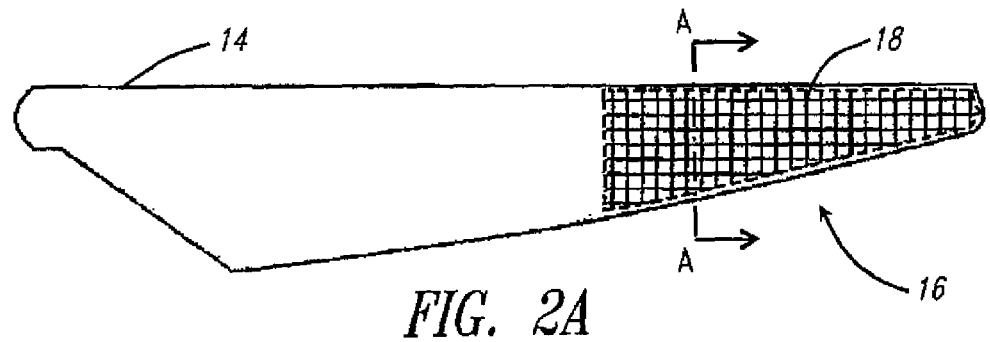
FIGS. 2A, 2B show plan views of the suction side of embodiments of a rotor blade according to the invention.
Figure 2B:
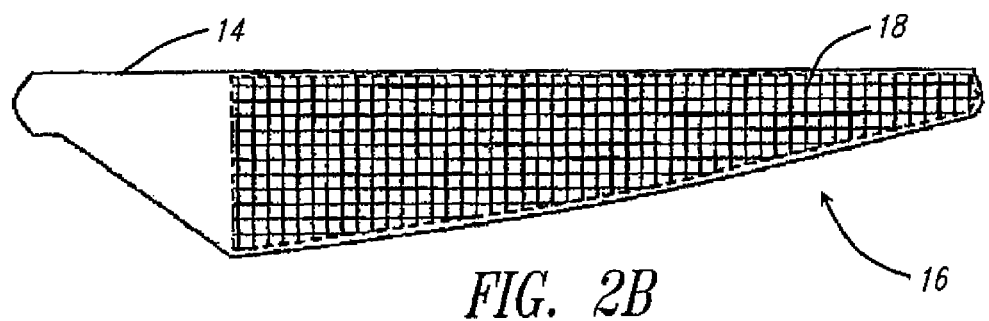

FIG. 2A is a plan view of the suction side of one embodiment of a rotor blade 14 according to the invention. The electrical field 16 is provided in the region from the leading edge of the rotor blade 14 as far as the trailing edge at at least 30% of the rotor blade 14 in the rotor blade tip region, that is to say the region which is furthest away from the rotor blade root of the rotor blade 14. FIG. 2B shows another embodiment of a rotor blade 14 in which the electrical field 16 is provided to cover lager region of the rotor blade 14.

Preferably a network-like conductor structure 18 is provided on the suction side of the rotor blade 14 to produce the electrical field 16. The network-like conductor structure 18 can comprise a conductor matrix (for example of copper), wherein a plurality of conductors are disposed in mutually juxtaposed transverse relationship with each other in a mesh configuration and the spacing parallel to each other is in the region of between about 1 and 10 mm, preferably in the region of 4 mm or less.

It was now surprisingly found that the application of an electrical field 16 of a value of between about −2 and −10 kV, preferably about −4 kV, causes the power value of the rotor blade 14 to rise, to a factor of between about 10 and 15%, preferably 12%. At the same time the level of acoustic power of the rotor blade 14 according to the invention is reduced by about 1 dB or less.

To maintain the electrical field 16 on the suction side an electrical power with rotor blades 14 of a length of about 20 m of about 5 kV per rotor blade has to be provided and with a rotor blade length of about 32 m the electrical power must be about 15 kV per rotor blade.

Figure 4:
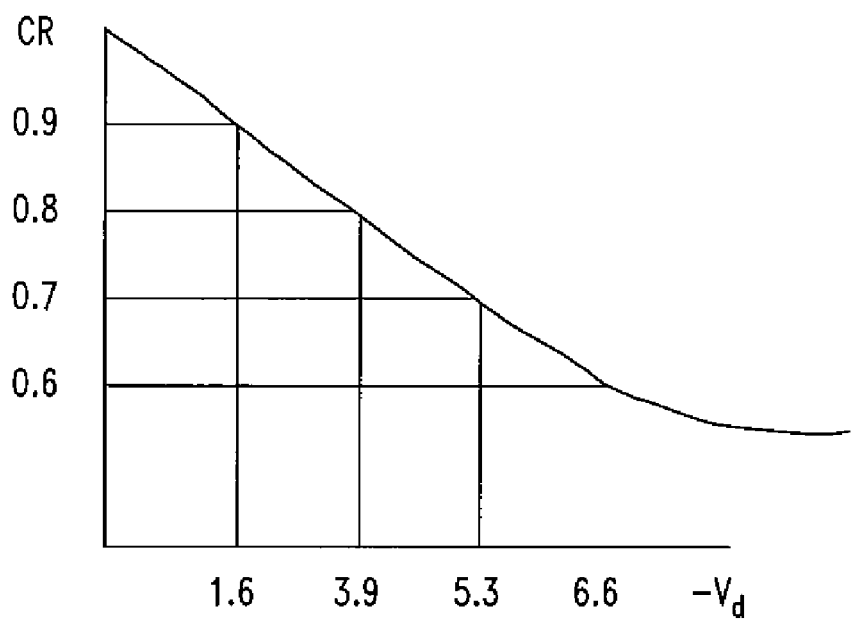
FIG. 4 shows the characteristics of the CR-value in dependence on the voltage of the electrical field.
Figure 5:
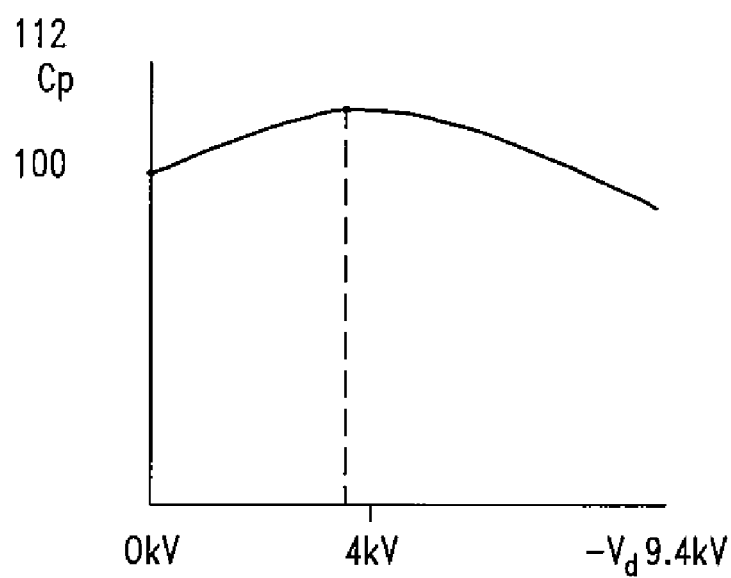
FIG. 5 shows the characteristics of the coefficient of power (Cp) in dependence on the voltage of the electrical field.
Figure 4:
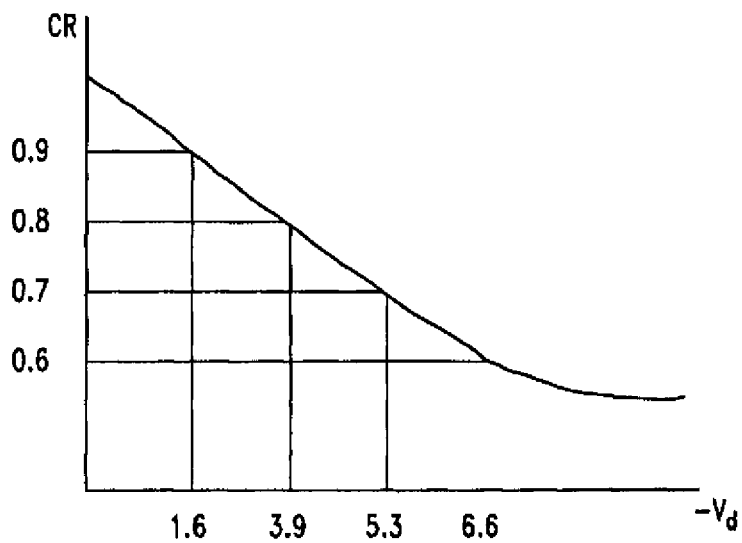
Figure 5:
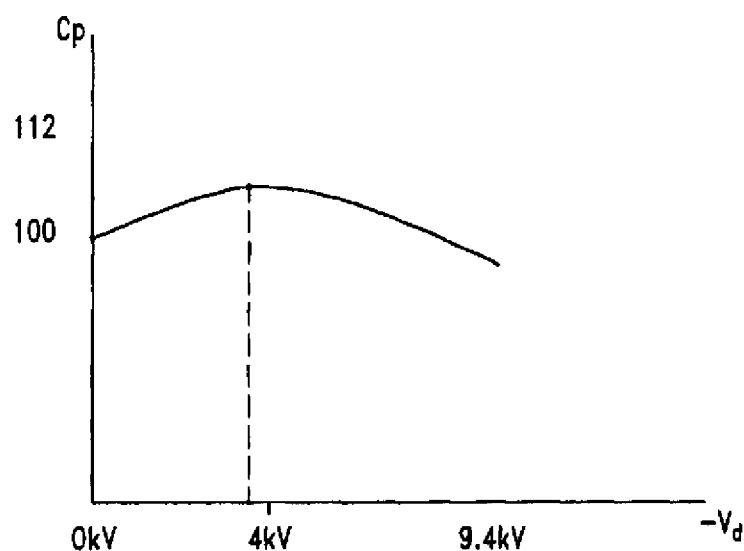

The graphs in FIG. 4 and FIG. 5 show the characteristics of the CR-value in dependence on the voltage of the electrical field and the characteristics of the coefficient of power (Cp) in dependence on the voltage of the electrical field.

| CR % | Voltage (V) |
|---|---|
| 100 | 0 |
| 90 | 1.6 |
| 80 | 3.9 |
| 70 | 5.3 |
| 60 | 6.6 |
| 50 | 7.5 |
| 40 | 8.2 |
| 30 | 8.8 |
| 20 | 9.2 |
| 10 | 9.3 |
| 0 | 9.4 |

It can be seen in that respect that the coefficient of power Cp reaches power values at about −4 kV and −3.9 kV respectively as a maximum and falls again at voltage values of less than −3.9 and −4 kV respectively.

Figure 3A:
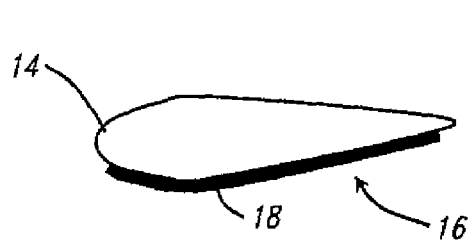
FIGS. 3A, 3B, 3C show simplified cross-sectional views of embodiments of a rotor blade according to the invention taken along line A-A of FIG. 2A.

FIG. 3A shows a simplified cross-sectional view of an embodiment of a rotor blade 14 according to the invention taken along line A-A of FIG. 2A. In this embodiment, the network-like conductor structure 18 is only on the suction side of the rotor blade 14. The size and shape of the electrical field will be determined by the value of the voltage placed on the conductor structure 18, as well as the shape of the blade and whether the blade has internal or external metal components, such as a front metal surface.

A layer that forms the outer layer of the blade which contacts the wind can be on top of the network conductor 18 in one embodiment. This layer can be a fiberglass, protective coating, plastic, laminate sheeting, polyvinyl sheeting that covers the network-like conductor structure 18 in order to give preferable properties to the surface of the rotor blade 14 and to protect the network-like conductor structure 18.

Figure 3B:
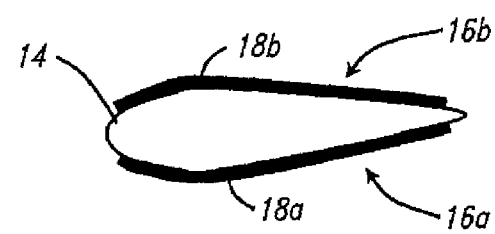

In another embodiment, an electrical field 16b for example with a voltage in the same direction or in opposite relationship can be applied at the pressure side of the rotor blade 14 as shown in FIG. 3B. In the embodiment in FIG. 3B, a network-like conductor structure 18b is installed on the pressure side of the rotor blade 14 as well as a network-like conductor structure 18a on the suction side of the rotor blade 14.

Figure 3C:
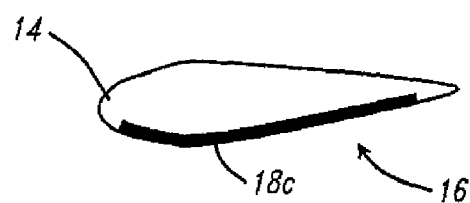

In yet another embodiment shown in FIG. 3C, a network-like conductor structure 18c is installed inside the rotor blade 14. According to this embodiment, the installation of the network-like conductor structure 18c does not affect the surface properties of the rotor blade 14.

The application of the electrical field 16 at the rotor blade 14 can comprise a galvanic connection between the rotor blade 14 and a voltage or charge supply device within the wind power installation 10. Preferably there are provided means for separating that galvanic connection, which means can be in the form of switches which already permit galvanic separation at the rotor blade 14, at the rotor blade root or the hub or within the wind power installation 10. It is also possible to provide more than one switch within the galvanic connection.

The galvanic separation between the voltage supply means and the rotor blade 14 is preferably interrupted when a thunderstorm is approaching. In that respect it is also possible for the interruption to take place automatically when a corresponding thunderstorm situation is detected. That can be measured by a sensor that detects, for example severe power fluctuations because severe power fluctuations of the wind power installation 10 or severe fluctuations in the wind are an indication of gusts which usually precede a thunderstorm. It is however also possible to detect an approaching thunderstorm by measurement of the electrical voltage within the air. Usually that voltage rises or falls when a thunderstorm approaches and can therefore be taken as a relatively reliable indication of such a thunderstorm.

Shutting down the field therefore by galvanic separation between the rotor blade 14 and the voltage supply means serves for protecting the entire wind power installation 10, in particular the rotor blades 14. It will be appreciated that it is also possible to control a corresponding interruption in the voltage supply means with other means which are already known and with which the approach of a thunderstorm can be detected.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation comprising:
    a rotor blade to rotate under power of wind, the rotor blade including:
        a high pressure side;
        a low pressure side, and
        a plurality of conductive members crossing each other in the form of a grid for producing a substantially constant area-covering electrostatic field adjacent to the grid on the low pressure side of the rotor blade;
    a generator coupled to the roter blade and configured to convert rotational energy of the rotor blade to electrical energy.

2. The wind power installation according to claim 1, wherein a spacing between adjacent conducting members in the grid is in range of between 2 and 10 mm.

3. The wind power installation according to claim 1, wherein a voltage applied to the grid is in a range of between −2 and −6 kV.

4. The wind power installation according to claim 1, wherein a desired dc voltage is applied to the grid from a DC voltage supply.

5. A rotor blade for a wind power installation comprising:
    a first side having a surface shaped to be a pressure side and receive the wind on the surface thereof;
    a second side having a surface shaped to be a suction side, behind the first side; and
    a grid conductor structure positioned adjacent to the surface of the second side of the blade.

6. The rotor blade according to claim 5, wherein the grid conductor structure is located in the tip region of the rotor blade.

7. The rotor blade according to claim 6, wherein the grid conductor structure covers at least 30% of the rotor blade.

8. The rotor blade according to claim 6, wherein the grid conductor provides a electronic field covering at least 30% of the rotor blade.

9. The rotor blade according to claim 5, further comprising:
    a grid conductor structure located on the pressure side of the rotor blade.

10. The rotor blade according to claim 5, further comprising:
    a coating layer over the grid conductor structure.

11. The rotor blade according to claim 5, wherein the grid conductor structure is located inside the rotor blade, adjacent to the surface.

* * * * *

UNITED STATES PATENT AND TRADEMARK OFFICE
CERTIFICATE OF CORRECTION

PATENT NO.       : 7,311,490 B2                                    Page 1 of 2
APPLICATION NO.  : 11/085630
DATED            : December 25, 2007
INVENTOR(S)      : Aloys Wobben It is certified that error appears in the above-identified patent and that said Letters Patent is hereby corrected as shown below:

<u>Figures 4 and 5</u>
The legends of the axes of the graphs of Figures 4 and 5 have been adjusted to more clearly denote the units represented by the axes.

<u>Column 2</u>
Line 30, "Voltage (V)" should read as -- -Voltage (V) --
Lines 42-45, "It can be seen in that respect that the coefficient of power Cp reaches power values at about -4 kV and -3.9 kV respectively as a maximum and falls again at voltage values of less than -3.9 and -4 kV respectively." should read as -- It can be seen in that respect that the coefficient of power Cp reaches power values at about -4 kV and -3.9 kV respectively as a maximum and falls again at voltage values of more than -3.9 kV and less than -4 kV, respectively. --

<u>Column 4</u>
Line 3, "a rotor blade to rotate under power of wind," should read as -- a rotor blade configured to rotate under power of wind --
Line 16, "the grid is in range of between 2 and 10 mm." should read as -- the grid is in a range of between 2 and 10 mm. --

Signed and Sealed this

Fourteenth Day of July, 2009

JOHN DOLL
*Acting Director of the United States Patent and Trademark Office*